United States Patent
Saunders

[11] 3,813,669
[45] May 28, 1974

[54] FREQUENCY FILTER CIRCUIT APPARATUS

[75] Inventor: Leonard Thomas Saunders, Milford, Mass.

[73] Assignee: Walter Kidde & Company, Inc., Clifton, N.J.

[22] Filed: Mar. 27, 1972

[21] Appl. No.: 238,175

[52] U.S. Cl. ............ 343/5 PD, 307/233, 340/258 A, 340/258 B
[51] Int. Cl. ............................................. G01s 9/02
[58] Field of Search ............ 343/5 PD, 5 DP, 7.7, 8; 340/258 A, 258 B, 258 R; 307/233

[56] References Cited
UNITED STATES PATENTS

| | | | |
|---|---|---|---|
| 3,184,606 | 5/1965 | Ovenden et al. | 307/233 |
| 3,242,486 | 3/1966 | Corbell | 343/5 PD |
| 3,610,901 | 10/1971 | Lynch | 343/5 DP |
| 3,680,074 | 7/1972 | Lieser | 343/5 PD |
| 3,701,149 | 10/1972 | Patton | 343/5 DP |

Primary Examiner—Maynard R. Wilbur
Assistant Examiner—G. E. Montone
Attorney, Agent, or Firm—John E. Toupal

[57] ABSTRACT

Disclosed is a sharp cutoff frequency filter. An alternating input signal derived from a source such as a Doppler detection system is fed to a threshold detector that provides a pulse output of a preselected first level when the alternating input voltage is below a predetermined input level and of a second preselected level during excursions of the alternating input above the predetermined threshold level. The two level pulse signal is next passed to a filter circuit. Within the filter, capacitive integration is provided such that energy is absorbed by a capacitor at a controlled rate when the pulse output is at the second preselected lvel and the capacitor is rapidly discharged when the threshold detector produces the first preselted output level. Thus, the energy stored in the capacitor is a measure of the total time that the second preselected digital output was produced in a particular cycle. A second threshold detector samples the energy stored in the capacitor and produces an output signal when energy in the capacitor exceeds a predetermined level. Thus, an output signal is supplied only if the alternating input signal possesses a minimum wave length and the filter circuit functions as a low pass filter. Another preferred embodiment is disclosed in which the quiescent output from the second threshold detector enables an output circuit to pass the pulse signal. The output circuit is disenabled only in the event that the alternating input signal possesses a wave length greater than a predetermined minimum length. Consequently, this second embodiment functions as a high pass filter. Additional related embodiments disclosed herein function as sharp cutoff notch and sharp cutoff band pass filters.

23 Claims, 13 Drawing Figures 3,813,669
SHEET 1 OF 3
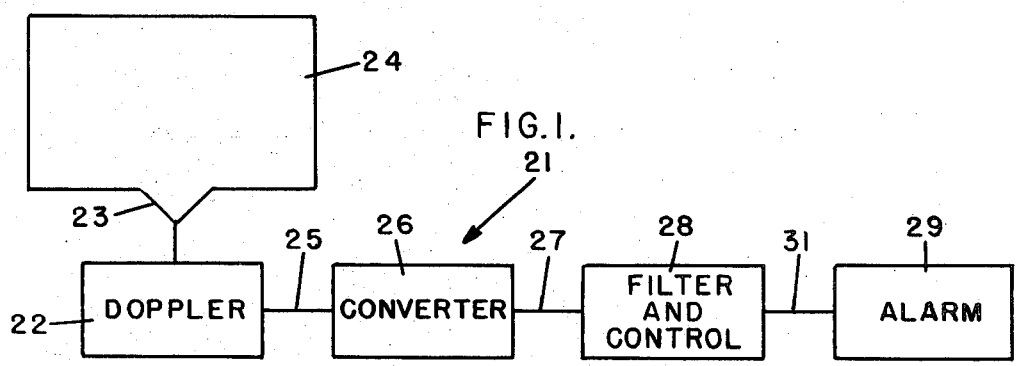
FIG.I.
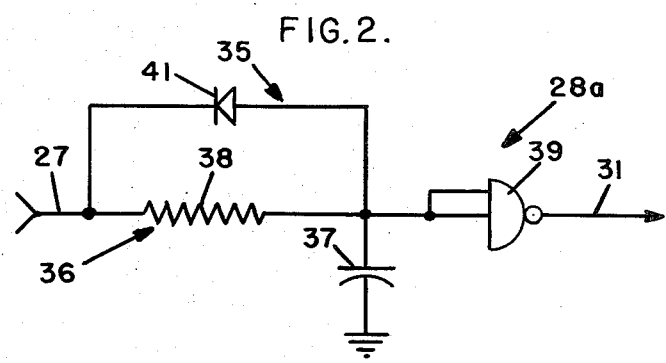
FIG.2.
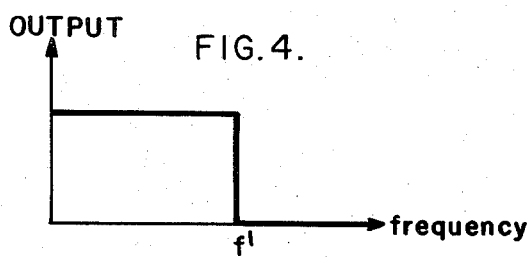
FIG.4.
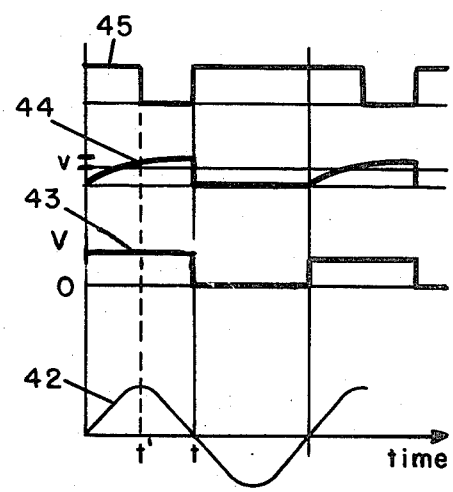
FIG.3.

FREQUENCY FILTER CIRCUIT APPARATUS

BACKGROUND OF THE INVENTION

This invention relates to frequency filters, and more particularly, to sharp cutoff frequency filters useful in such devices as Doppler detection systems.

Wave energy intrusion detection systems for indoor and outdoor volumetric and perimeter protection generally propogate wave energy throughout an area under surveillance and sense an intrusion by detecting changes in the waves caused by any object entering the area. Such systems comprise a source of wave energy, for example a source of ultrasonic or microwave energy, a transducer or antenna for transmitting the waves into the area and receiving apparatus to continually monitor reflected waves. A sample of the transmitted energy is compared with the receiver output to detect any motion within the area by the conventional Doppler technique. While such Doppler detection systems work reasonably well, certain practical difficulties have limited their use. Such difficulties generally relate not to a failure of the system to respond to a genuine intrusion, but rather to false responses indicating intrusions when in fact there have been none. Such false alarms discourage potential users of Doppler intrusion systems and are a source of annoyance to guards and local police who must respond to each such alarm. Consequently, a present need is to reduce the incidence of false alarms without adversely affecting the reliability of the system with respect to actual intrusions.

False alarms are caused not only by spurious signals but also by signals that are actually received but which do not represent an intrusion for which actuation is desired. For example, the movement of a small animal such as a mouse very near the transmitter within the protected zone can cause actuation as can movement outside the zone by large objects such as automobiles. To prevent such actuation the Doppler signal is usually subjected to filtering before detection by the alarm system. The filters typically include threshold detectors to eliminate low amplitude Doppler signals that are often caused by small objects within the zone and frequency sensitive components to remove Doppler signals of frequencies that correspond to detected velocities beyond the range of interest. For example, if an intrusion system seeks to detect human beings on foot, velocities greater than 15 miles per hour will be of no interest.

The filter system, however, should be relatively insensitive to amplitude variations over a wide range of acceptable amplitudes. For example, intrusion by a small child produces relatively low level Doppler signals that should be detected with accuracy equal to those of higher amplitude signals produced by the intrusion of a large man. Such amplitude variations complicate the filtering function in that the filters must reject high amplitude Doppler signals that are within a forbidden band, or just outside the allowed pass band, while passing low level signals within the pass band, but near the edge thereof. Attainment of the objective requires sharp cutoff in response that is not available in conventional filters of reasonable cost.

Another cause of false alarms is interference from extraneous sources having outputs within the range of interest. For example, in an X-band microwave Doppler intrusion system the Doppler frequencies of interest are generally between 5 and 300 Hertz. Thus fluorescent lighting which produces a strong signal at 120 Hertz is a recurrent source of false alarms. This problem could be eliminated by a notch filter rejecting frequencies in a narrow band within the range of interest but again a very sharp frequency cutoff would be required if adequate detection sensitivity is to be retained.

The object of this invention, therefore, is to provide a sharp cutoff filter circuit that is highly reliable, low in cost and insensitive to relative signal amplitudes above a predetermined minimum amplitude.

SUMMARY OF THE INVENTION

This invention is characterized by a sharp cutoff low pass filter and control circuit that can be utilized in a Doppler intrusion detection system. The filter is connected between a detector and an output device such as an alarm, and passes only signals within predetermined amplitude and frequency ranges to the alarm. Signals outside the predetermined ranges, which may represent transients within the intrusion system, or true intrusions for which actuation is not desired, are suppressed. Alternating analog Doppler signals are passed from the detector to a threshold converter within the filter circuit that produces a pulse output of a first preselected level in response to an analog signal that is below a predetermined level and produces an output of a second preselected level in response to an analog signal that is of an amplitude greater than the predetermined level. Thus, received Doppler signals are suppressed if a predetermined minimum amplitude is not present and are converted to a digital signal if a threshold is exceeded during part of the a.c. cycles. The two level pulse signal is supplied to a resistor that charges an energy storage capacitor at a controlled rate when digital signal exceeds the capacitor voltage. Ordinarily, no Doppler signal will be detected by the system, thus the converter output will be at the first preselected level. Consequently, only in the event that a Doppler signal is received will the converter output switch to the second (higher) level, thereby charging the capacitor. A voltage threshold detector samples the voltage across the capacitor and produces an output in response to a predetermined voltage level that is reached only after a predetermined charging time. The required charging time, or the time that the threshold converter must produce the second output to cause actuation of voltage threshold detector, is a function of the difference between the first and second preselected outputs and the values of the resistance and energy storage capacitance and thus may be selected from a wide range. To recapitulate, operation is as follows: Under normal circumstances the output of the threshold converter is at the first level and the capacitor is charged to a quiescent level. The capacitor begins to charge further when the threshold converter produces the second output level. If the second output level persists for longer than the predetermined time, the voltage threshold detector supplies an output to the alarm. If, however, the second pulse output does not persist for the predetermined time, the energy storage capacitor is immediately returned to its quiescent charge upon the return of the pulse signal to the first state. Consequently, the filter provides its full output in the event that the threshold converter produces the second output for a period of time longer than a predetermined time. Inasmuch as the time period that the second pulse output persists is dependent upon the continuity of a received Doppler signal, and the filter provides an output only if a minimum predetermined pulse width is received, the filter and control circuit is a sharp cutoff low pass filter. It should be noted that the filter output provided by the voltage threshold detector is either zero or its full rated output, never an intermediate value, and is independent of the amplitude of the received Doppler signal provided that the received analog signal exceeds the minimum required threshold.

Another preferred embodiment of the filter and control circuit is a high pass filter. This embodiment comprises, in addition to the components described above, a pulse output circuit coupled to the alarm. The pulse output circuit may, for example, be a trailing edge triggered one-shot, A filter circuit, similar to the low pass circuit described above, is connected to the one-shot by an inhibit diode such that when the energy storage capacitor is charged to less than the predetermined level the one-shot is enabled and produces an output in response to each second-to-first level transition of the pulse signal. In the event that the pulse width of the pulse signal, that is the time in the second preselected state, exceeds the minimum predetermined width for the low pass filter, the output thereof, through the inhibit diode, blocks the operation of the one-shot so that no output is produced during the subsequent second-to-first level transition. The features described with respect to the low pass filter above are also evident in the high pass filter. For example, the sharp cutoff characteristic is provided and the cutoff frequency can be preselected by proper selection of the resistor and capacitor.

Yet another preferred embodiment of the invention is a band pass filter that is similar to the high pass filter described above in that the trailing edge triggered one-shot is inhibited in the event that the frequency of the pulse signal is lower than a predetermined frequency. However, also connected to the edge triggered one-shot, by a second diode, is a second (low pass) filter than inhibits the edge triggered one-shot in the event that the frequency of the pulse signal is greater than a second predetermined frequency. The one-shot produces no output if inhibited by either filter. The critical frequency for the high pass filter is lower than the critical frequency for the second filter. Thus, only in the overlapping range does neither filter inhibit the one-shot. Consequently, a band pass filter is provided with a sharp cutoff on both ends of the permissible frequency range. In addition, the other advantages mentioned with respect to the previously described embodiments are evident. For example, the band pass filter is insensitive to the amplitude of the received Doppler signal, provided the received Doppler signal exceeds a minimum predetermined level.

Still another preferred embodiment of the invention is a notch filter. An edge triggered one-shot in the notch filter is enabled by a NAND gate unless the gate simultaneously receives appropriate signals from each of two filters. A first filter, which is responsive to the low frequency of the notch, normally provides no signal to the NAND gate. Only in the event that the frequency of the received pulse signal is greater than the low notch frequency is an output supplied by the first filter. A second filter includes an inverter and provides an input to the NAND gate unless the frequency of the pulse signal exceeds the upper frequency of the notch. Thus, when the frequency of the pulse signal is below the minimum notch frequency no signal is received by the NAND gate from the first filter and the edge triggered one-shot remains enabled. When the frequency of the pulse signal is within the range of the notch, the first filter now provides an output, and the second filter still provides an output, and the NAND gate, in response to the simultaneous receipt of both outputs, inhibits the one shot, and thus no output is produced. In the event that the frequency of the pulse signal exceeds the upper notch frequency, the first filter provides a signal to the NAND gate, however the second filter does not and therefore the NAND gate enables the edge triggered one-shot and the notch filter provides an output. The notch filter also possesses the significant advantages mentioned above such as a sharp cutoff.

DESCRIPTION OF THE DRAWINGS

These and other features and objects of the present invention will become more apparent upon a perusal of the following description taken in conjunction with the accompanying drawings wherein:

FIG. 1 is a block diagram of a Doppler intrusion alarm system;

FIG. 2 is a schematic diagram of a low pass filter and control circuit;

FIG. 3 shows waveforms present at various points within the system shown in FIG. 2;

FIG. 4 is a frequency response curve of the circuit shown in FIG. 2;

DESCRIPTION OF THE PREFERRED EMBODIMENTS

Figure 5:
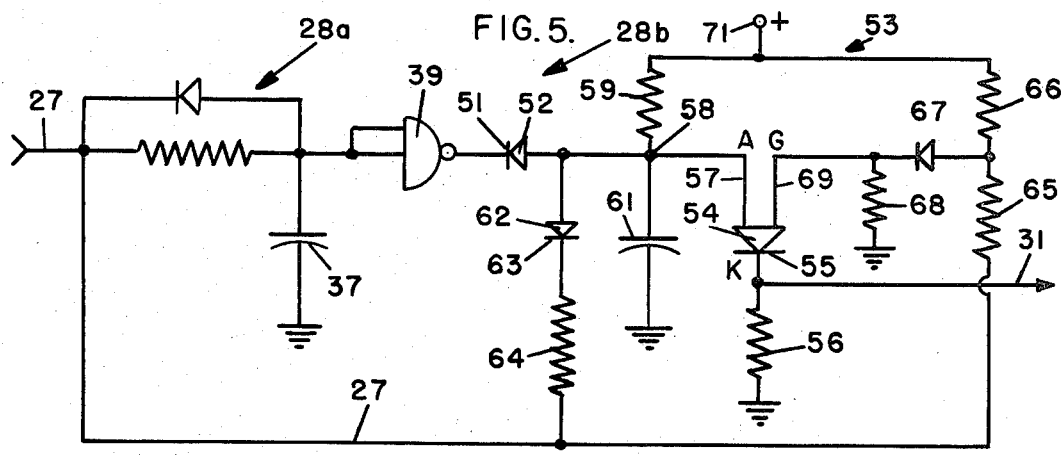
FIG. 5 is a schematic diagram of a high pass filter.

Referring first to FIG. 1 there is shown a diagram of a Doppler intrusion detection system 21 including a Doppler apparatus 22 with a transmitting and receiving antenna 23 that projects energy into, and receives reflected energy from a given zone 24, such as an enclosure. A line 25, leading from the Doppler apparatus 22 to a threshold converter 26, carries alternating analog signals produced within the Doppler apparatus 22 resulting from the receipt of Doppler shifted energy by the antenna 23. The threshold converter 26 provides a two level pulse output on a line 27 with a quiescent level that is produced when the alternating analog signal is below a predetermined threshold, and a second, excited level produced during excursions of the alternating analog signal above the predetermined level. Thus, the signal on the line 27, which is delivered to a filter and control circuit 28, is a pulse signal comprised of a series of step functions with a periodicity dependent upon the alternating analog signal. A timing circuit (described below) within the filter and control circuit 28 responds to predetermined periodicity conditions of the pulse signal and supplies, in response thereto, an output signal to an output alarm 29 on a line 31. The filter and control circuit 28 insures that the alarm 29 only responds to alternating analog signals representing a true intrusion for which an actuation is desired.

During operation of the embodiment 21 any movement within the zone 24 is detected by the Doppler apparatus 22 and results in an output signal on the line 25. If the alternating analog signal is of sufficient amplitude, the two level pulse signal is present on the line 27 and if the pulse signal conforms to certain predetermined periodicity conditions the filter and control circuit 28 actives the alarm 29. Several preferred embodiments for the filter and control circuit 28 are described below. Precise descriptions of predetermined periodicity characteristics and the associated filters responsive thereto as well as typical uses therefor are discussed below.

Referring now to FIG. 2, there is shown a schematic diagram of a preferred filter and control circuit 28a including a timing circuit 35 with a pulse continuity network 36 comprising an energy storage capacitor 37 and a regulator resistor 38. The pulse continuity network 36 is responsive to the width of the pulses defined by the two level pulse signal on the line 27 as will be described below. A keying inverter 39 is coupled to the pulse continuity network 36 and provides the output signal on the line 31 in response to a predetermined pulse width. The keying inverter 39 comprises a two input NAND gate that responds only to inputs above a predetermined level. In this preferred embodiment 21 the two level pulse signal on the line 27 has a quiescent value of 0 volts. In response to an input signal on the line 25 above the predetermined level, the threshold converter 26 produces an output of V volts. When this excited output of V volts is being supplied, the capacitor 37 begins to charge through the resistor 38 and when the voltage on the line 27 returns to zero the capacitor 37 immediately discharges through a discharge diode 41 connected between the capacitor 37 and the line 27.

Operation of the filter and control circuit 28 described in FIG. 2 is best understood with reference to FIGS. 1, 2, and 3. FIG. 3 shows waveforms at various points within the apparatus. First, a waveform 42 shows an alternting analog Doppler signal that is produced on the line 25 in response to movement within the zone 24. The next waveform 43 is a two level pulse signal produced on the line 27 in response to excursion of the analog signal above the predetermined threshold level of the threshold converter 26. That threshold is selected to be a small portion of the signal amplitude levels of interest so as to provide therefor a digital pulse with a width substantially equal to on half cycle of the analog input and for reasons of clarity FIG. 3 illustrates waveforms for a zero threshold. As shown, positive excursions by the analog voltage on the line 25 cause an output on the line 27 of V and quiescent values or negative excursions of the analog voltage supplied to the threshold converter 26 produce no output on the line 27. In response to an output of V volts on the line 27, the capacitor 37 begins to charge with a characteristic exponential curve as illustrated by waveform 44 of FIG. 3. When a predetermined minimum level v is reached, the keying inverter 39 responds and switches from its normal high state to a low state as shown by the waveform 45. The waveform 45 is present on the line 31 and the high to low transition activates the alarm 29. As shown by FIG. 3, when the analog signal on the line 25 crosses the zero voltage threshold point at a time $t$ the voltage on the line 27 drops to zero so the storage capacitor 37 immediately discharges through the diode 41 and the voltage thereacross returns to zero and consequently the voltage on the line 31 returns to the quiescent high state. It should be noted that the charging of the capacitor 37, represented by the waveform 44, always proceeds at the same rate, inasmuch as the rate depends only on the resistance, the capacitance and the value of V. Thus, the voltage on the line 31 remains in the quiescent high state unless the width of the high pulse shown in the waveform 43 persists for at least the time $t'$ to trigger the NAND date 39, thus providing the low level or alarm output level. If the pulse width is less than $t'$ the voltage on the line 31 remains in the normal high state which represents no output and the alarm 29 is not activated. Thus, the frequency response of the filter is as shown by the frequency response diagram in FIG. 4. A low level alarm output is produced on line 31 for a low frequency spectrum (corresponding to long pulse widths on the line 27) with a sharp cut off at a frequency $f'$ (for which the associated pulse width equals $t'$). Above the frequency $f'$ the quiescent high level or no alarm output persists. Thus the circuit functions as a low pass filter useful in Doppler intrusion detection systems that seek to detect only low velocity intrusions, such as human beings on foot. The low pass filter 28a suppresses signals with a frequency corresponding to velocities for example, above 10 mph.

Referring to FIG. 5, there is shown a diagram of a filter and control circuit 28b that is a high pass filter. A filter circuit 28a, similar to that shown in FIG. 2, delivers the signal described above to a cathode 51 of an inhibit diode 52. Thus, the cathode 51 is retained at a high level when no signal is received on the line 27 and when the two level pulse signal on the line 27 is of such a high frequency that the filter circuit 28a cannot respond thereto. Only in the event that the two level pulse signal is of a frequency less than $f'$, as shown in FIG. 4, is the potential on the cathode 51 reduced to zero. Also included in the filter circuit 28b is a trailing edge triggered pulse output one-shot 53 including a programmable unijunction transistor 54. A cathode 55 of the transistor 54 is connected to the output line 31 and to ground by a resistor 56. An anode 57 of the transistor 54 is connected to a junction 48. Also connected to the junction 58 is a charging resistor 59, a capacitor 61, the inhibit diode 52 and the anode of a second diode 62. A cathode 63 of the second diode 62 is connected to the line 27 by a discharge resistor 64. The line 27 is connected to a first divider resistor 65 that, in conjunction with a second divider resistor 66, forms a voltage divider, the output of which is carried by a diode 67 to both a bias resistor 68 and a gate 69 of the transistor 54. The other end of the voltage divider is connected to a positive voltage input terminal 71.

The transistor 54 conducts from the anode 57 to the cathode 55 in the event that the anode voltage is higher than the gate voltage. The gate voltage is controlled by the voltage at the center point of the voltage divider comprised of the resistors 65 and 66. That voltage will always be between the voltage at the positive voltage terminal 71 and the voltage on the line 27. Consequently, the gate voltage will respectively rise and fall during first-to-second and second-to-first level transitions of the pulse signal. The positive supply voltage and the resistors 65, 66, and 68 are chosen such that the transistor 54 will conduct only when the voltage on the line 27 is at the first, or low state, and, even then, conduction is dependent upon the voltage at the junction 58. Inasmuch as the diode 62 is forward biased, the resistors 59 and 64 comprise a voltage divider with a center point at the junction 58. The resistor 59 is selected to be of a much larger value than the resistor 64 so that the voltage differential between the junction 58 and the line 27 is small in comparison with the voltage differential between the point 71 and the junction 58. Consequently, the capacitor 61 cannot absorb a significant charge as long as the potential on the line 27 remains substantially below V volts. However, when the potential on the line 27 switches to the high or excited state, the capacitor 61 is rapidly charged by the resistor 59, provided that the cathode 51 of the inhibit diode is at the high state. Thus, the capacitor 61 cannot absorb a significant charge unless the signal on the line 27 is at the high state and the frequency of the digital signal is above $f'$ so that the filter circuit 28a does not respond thereto. In the event that the frequency of the two level pulse signal on the line 27 is below $f'$, the keying inverter 39 will respond thereto and the cathode 51 will be held at the ground level, thus forward biasing the diode 52 and removing any charge from the capacitor 61. To recapitulate, if no signal is present on the line 27 the capacitor 61 cannot absorb a charge because of the forward bias of the diode 62, and if a digital signal is present on the line 27 but is of a frequency below $f'$ the capacitor 61 is discharged through the inhibit diode 52. However, if the frequency of the pulse signal is above $f'$, the capacitor 61 becomes charged when the signal on the line 27 is in the high, excited state. When the capacitor 61 is charged and the gate voltage drops below the anode voltage, the transistor 54 conducts and discharges the capacitor 61 through the resistor 56 thereby producing a pulse at the cathode 55 and on the output line 31.

The input on the line 27 can take any of three forms. 1. No signal; 2. Pulses of frequencies less than $f'$; and 3. Pulses representing analog signals of frequencies greater than $f'$.

No output is produced when no signal input is supplied on line 27 because the capacitor 61 is constantly discharged through the diode 62.

When a pulse representing a frequency below $f'$ is applied through the line 27, the capacitor 61 charges through the resistor 59. However, the pulse output circuit 53 produces an output only in response to the second-to-first level transition on the line 27, thus no response is yet produced. As shown in FIG. 3, after a time of $t'$, the voltage on the capacitor 37 is sufficient so that the inverter 39 responds thereto and holds the cathode 51 of the inhibit diode 52 at zero volts. Consequently, the capacitor 61 is immediately discharged through the inhibit diode 52 and remains discharged. Thus, there is no response on the line 31 when the input signal on line 27 falls from a high to a low level.

The other input condition is that of a two level digital signal with a pulse width representing a frequency greater than $f'$. When the signal on the line 27 switches to V volts, the capacitor 61 charges as described above. Since the frequency is above $f'$, the filter circuit 28a will not respond and the capacitor 61 does not discharge through the inhibit diode 52. Consequently, on the subsequent second-to-first level transition on line 27 the gate voltage of the transistor 54 will drop to a level below the anode voltage since the capacitor 61 does not discharge instantaneously through the diode 62 due to the small resistor 64. Thus, at the time of the transition, the transistor 54 conducts to discharge the capacitor 61 through the resistor 56. The discharge current creates an output pulse on the line 31 that activates the alarm 29.

Figure 6:
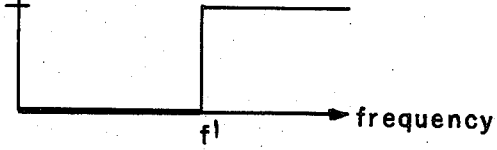
FIG. 6 is a frequency response curve of the circuit shown in FIG. 5.

It will be apparent, therefore, that the filter and control circuit 28b is a high pass filter with a frequency response as shown in FIG. 6. Another typical use for the Doppler system 21 utilizing the high pass filter 28b is an automobile anticipatory crash sensor for controlling automatically deployable passenger restraint devices such as "air bags" rather than an alarm 29. A high pass filter is desirable in such a system to present inadvertent deployment of the restraint prior to low speed collisions, for example, collisions with a relative velocity of below 10 mph. Utilization of the high pass filter 28b provides reliable actuation of the restraint in the event that a high velocity collision is sensed, but prevents actuation in response to an anticipated low speed collision.

Figure 7:
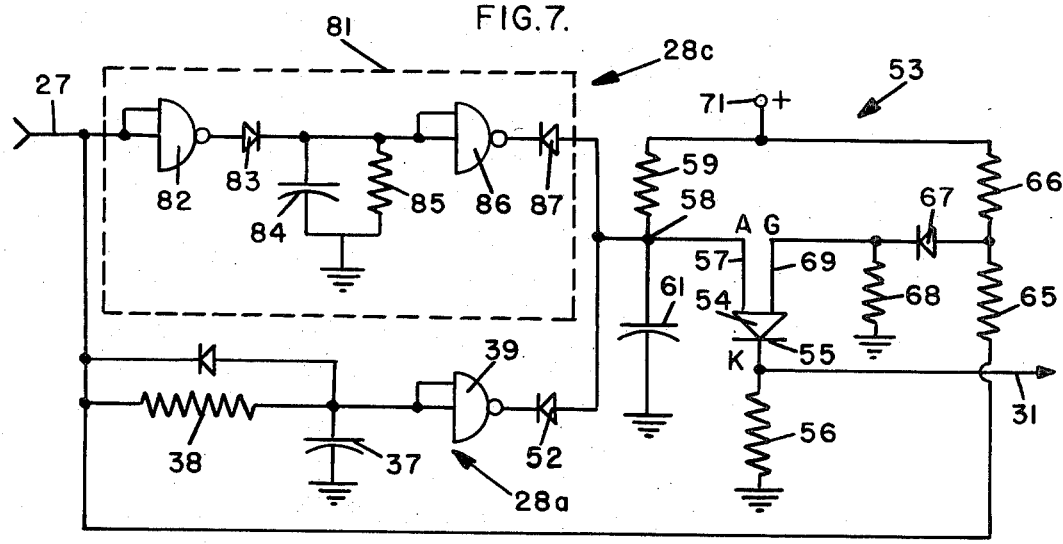
FIG. 7 is a schematic diagram of a sharp cut off bandpass filter.

Referring now to FIG. 7 there is a diagram of a filter and control circuit 28c that is a band pass filter. It is first noted that, with the exception of the absence of the diode 63 and the resistor 64, the band pass filter 28c comprises the high pass filter 28b shown in FIG. 5. In addition, a low pass filter 81 couples the line 27 to the junction 58 within the pulse output one-shot 53. Within the low pass filter 81, the line 27 is connected to an inverter 82 and the output of the inverter is passed by a charging diode 83 to a parallel combination of an energy storage capacitor 84 and a discharge regulator resistor 85. Energy stored in the capacitor 84 is sampled by a voltage threshold detector 86 that is a NAND gate and thus functions as an inverter. The output of the NAND gate 86 is coupled to the junction 58 by a second inhibit diode 87.

Under normal conditions, the voltage on the line 27 remains at zero. Thus, the inverter 82 fully charges the capacitor 84 with a high level signal. The voltage of the fully charged capacitor 84 exceeds the critical voltage of the voltage threshold 86 and thus the threshold 86 inverts, holding the cathode of the second inhibit diode 87 at ground. Therefore, the capacitor 61 cannot charge and the one shot 53 cannot produce an output. In the event that the signal on line 27 switches to the high, or excited state, the output of the inverter 82 switches to zero. The capacitor 84 cannot discharge through the now back biased charging diode 83. However, discharge does occur at a controlled rate through the regulator resistor 85. If the high level signal remains on the line 27 for a predetermined period of time, the capacitor 84 discharges to a level insufficient to key the inverter 86. Consequently, if the two level pulse signal on the line 27 exceeds a predetermined critical pulse width the threshold voltage detector 86 changes state thus raising the cathode of the second inhibit diode 87 to the high state and permitting the capacitor 61 to charge. The capacitor 84 and the resistor 85 are chosen such that the critical frequency of the low pass filter 81 is a frequency $f''$ that is higher than the frequency $f'$. Therefore, disregarding the filter 28a the remaining components of circuit 28c comprise a low pass filter with a frequency response as shown by the diagram 88 in FIG. 8a.

Operation of the circuit 28c is as follows. With no signal on line 27 the inverter 82 produces a high output fully charging the capacitor 84, the voltage threshold inverter 86 produces a zero output and the capacitor 61 is discharged through the second inhibit diode 87 so that no pulse output is possible. In the event that an a.c. pulse signal with a frequency below $f'$ is supplied to the line 27 both the filter circuit 28a and the filter circuit 81 respond. Thus the inverter 39 produces a low output and discharges the capacitor 61 through the inhibit diode 62 before the subsequent transition. Again no output is produced by circuit 53. However, if a pulse signal with a frequency between $f'$ and $f''$ is applied to the line 27 the filter circuit 28a does not respond and the output of the NAND gate 39 remains high to prevent discharge of the capacitor 61. This is shown by the frequency response diagram of FIG. 6. In addition, with the frequency below $f''$, the low pass filter 81 does not respond as shown by the frequency response diagram 88 in FIG. 8a, to produce a high level output from the NAND gate 86 that also prevents discharge of the capacitor 61. Consequently, the capacitor 61 charges and a pulse is produced on the line 31 during the subsequent trailing second-to-first level transition on line 27. In the event that a pulse signal of a frequency higher than $f''$ is supplied on the line 27, the low pass filter 81 cannot respond thereto. Accordingly, the capacitor 61 is continually discharged through the diode 87 and no output is produced by the one-shot 53.

Figure 8A:
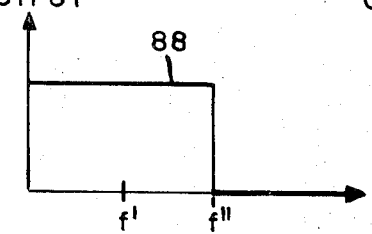
FIG. 8a is a frequency response curve of a portion of the circuit shown in FIG. 7.

A review of the above described operation demonstrates that the one-shot 53 produces an output only if not disabled by response of auxiliary voltage threshold detector 39 to a pulse width representing a frequency below $f'$ (FIG. 6) after first being enabled by response of primary voltage threshold detector 86 to a pulse width representing a frequency below $f''$ (FIG. 8a). A comparison of the frequency response diagram in FIGS. 6 and 8a shows that an output is obtained from the circuit 28c therefore, only in the overlapping portion of the frequency spectrum. Thus, the circuit 28c is a short cutoff band pass filter that rejects signals outside of the frequency range $f'$ to $f''$ as shown by the diagram in FIG. 8b.

Typical uses for the circuit 28c include X band Doppler intrusion detection systems. The Doppler frequencies of interest in such systems are usually between 5 and 300 Hertz. The low frequency signals are rejected to prevent power line fluctuations and the like from producing an output. Higher frequencies are suppressed as corresponding to velocities too high to be of interest.

Figure 9:
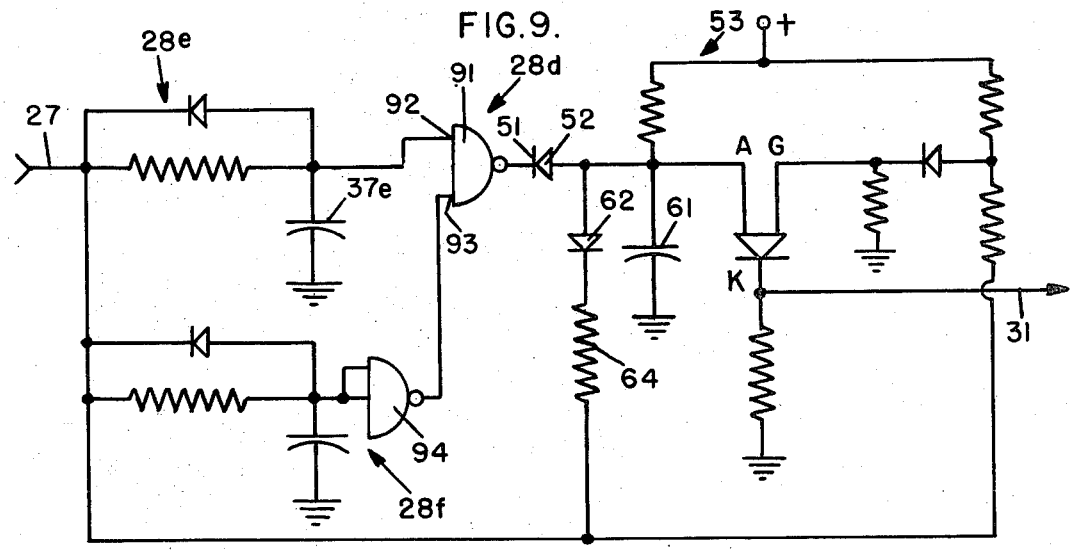
FIG. 9 is a schematic diagram of a sharp cutoff notch filter.

Referring next to FIG. 9, there is shown a diagram of a notch filter 28d. The inhibit diode 52 and the pulse one-shot 53 are similar to those shown in the embodiment 28b in FIG. 5. The pulse one-shot 53 produces an output on the line 31 in response to a high-to-low level transition on the line 27 provided a charge exists on capacitor 61. Again, the capacitor 61 can charge to arm the one-shot 53 if the cathode 51 of the diode 52 is held at a high voltage level by the threshold inverter gate 91. Such an output is provided by the threshold inverter gate 91 if either a first input 92 or a second input 93 thereof is at a low or 0 volt level. Coupled to the first input 92 is a filter circuit 28e that is similar to the circuit 28a and is responsive only to frequencies less than $\omega_1$. That is, only in the event that the pulse width of the two level pulse signal on the line 27 represents a frequency below $\omega_1$ will the capacitor 37e charge to a sufficient level that the voltage thereacross will be interpreted by the gate 91 as a high level signal. Connected to the second input 93 is a second filter 28f, also similar to the filter 28a, and responsive only to frequencies below $\omega_2$ which is lower than $\omega_1$. However, the filter 28f includes an enabling threshold inverter 94 so that the signal delivered to the second input 93 is of the high state unless the pulse width of the pulse signal on line 27 represents a frequency below $\omega_2$.

Operation of circuit 28d is as follows. In the event of zero signal input on the line 27, the capacitor 61 is discharged through the diode 62 and the resistor 64 so that no output on the line 31 results.

If an a.c. pulse signal is applied to the line 27 with a pulse width representing a frequency above $\omega_1$, neither filter 28e or 28f responds, Thus, the first input 92 of the gate 91 remains at the low level and the input 93 remains at the high level. Since two high level inputs are required to activate the gate 91 so as to inhibit the one-shot 53, an output is produced on the following high-to-low level transition on line 27.

In the event that an a.c. pulse signal with a pulse width representing a frequency between $\omega_1$ and $\omega_2$ is applied to the line 27, the filter 28e responds thereto and disenables the circuit 53 by applying a high level signal to the primary input of the detector gate 91. The filter 28f does not respond to signals in this frequency range so the signal delivered to the auxiliary second input 93 remains high, and thus the output of the gate 91 delivered to the cathode 51 is low. Accordingly, the capacitor 61 is discharged through the inhibit diode 52 and no output is produced during the subsequent high-to-low level transition on the line 27.

Conversely, if an a.c. pulse signal is applied to line 27 with a pulse width representing a frequency below $\omega_2$, both filters 28e and 28f will respond thereto. The result of such dual response is that after being disenabled by the primary high level signal delivered to the primary input 92, the one-shot 53 is reenabled by the low level signal delivered to the auxiliary input 93. The resultant high level output of the detector gate 91 fails to inhibit the one-shot 53 and an output pulse is produced on the subsequent trailing high-to-low level transition on the line 27. Thus, the circuit 28d is a notch filter and produces an output in response to all a.c. frequencies without the band $\omega_2$ to $\omega_1$ as shown by a frequency response diagram in FIG. 10. Typical uses for the notch filter circuit 28d include, for example, X band Doppler intrusion detection systems. As mentioned previously, the Doppler frequency range of interest in such systems lies between approximately 5 and 300 Hertz. However, fluorescent lighting produces strong interference signals at 120 Hertz. Thus a notch filter can be employed to eliminate, for example, the frequency range between 118 Hertz and 122 Hertz. The circuit 28d is particularly desirable for such an application because of its sharp cutoff characteristics that retain for the system full sensitivity to signals outside the notch band.

Figure 8B:
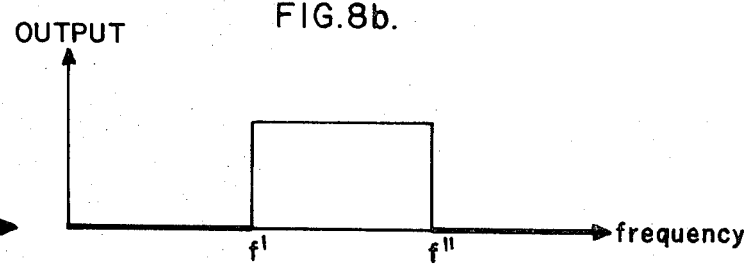
FIG. 8b is a frequency response curve of the circuit shown in FIG. 7.
Figure 10:
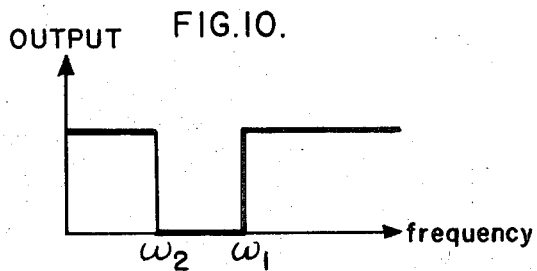
FIG. 10 is a frequency response diagram of the circuit shown in FIG. 9.
Figure 11:
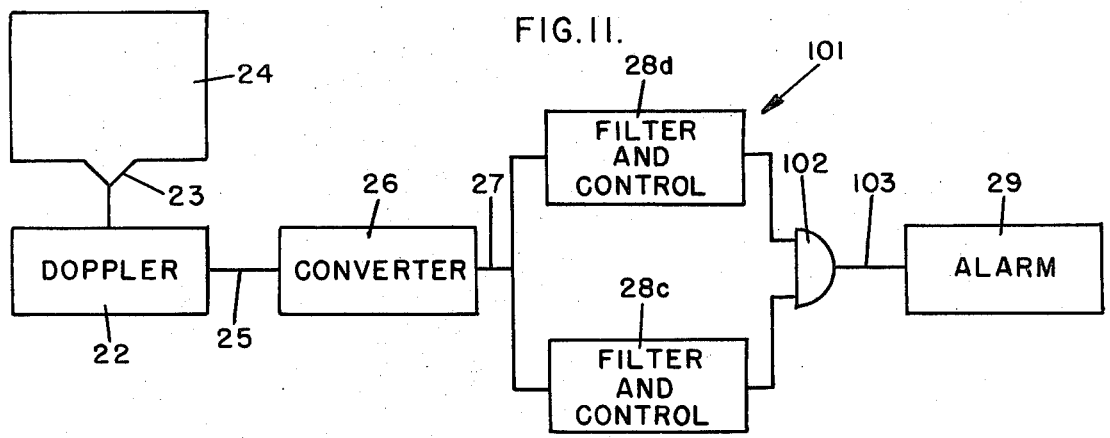
FIG. 11 is a block diagram of another preferred Doppler intrusion alarm system.
Figure 12:
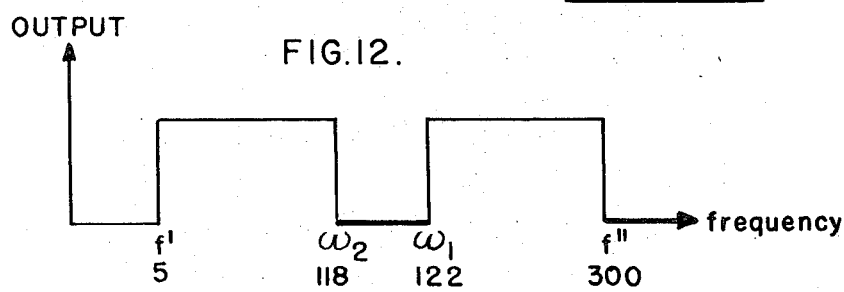
FIG. 12 is a frequency response diagram of the intrusion alarm system diagrammed in FIG. 11.

Referring now to FIG. 11 there is shown a block diagram of another embodiment of a Doppler intrusion detection system 101. This system 101 is similar to the system 21 shown in FIG. 1 except that the line 27 feeds two parallel filters, a band pass filter 28c and a notch filter 28d of the types described above. The filter outputs are fed to a NAND gate 102 with produces an output on a line 103 in the event that both filters 28c and 28d respond to the signal on the line 27. Any output on the line 103 activates the alarm 29. Superimposition of the frequency response diagrams of the two filters 28c and 28d, as shown in FIGS. 8b and 10 respectively, provides the spectrum for which both filters will supply an output to the gate 102. That spectrum is shown in FIG. 12 and is a pass band extending from $f'$ to $f''$ interrupted by a notch between $\omega_2$ and $\omega_1$. The system 101 can be used as described above as an X band Doppler intrusion system and provides the additional advantage of rejecting low frequencies of, for example, less than 5 Hertz. Thus, in a typical embodiment of the system 101, the capacitance and resistance values are chosen such that $f'$ is 5 Hertz, $\omega_2$ is 118 Hertz, and $\omega_1$ is 122 Hertz, and $f''$ is 300 Hertz.

Obviously, many modifications and variations of the present invention are possible in light of the above teachings. For example only, the sharp cut off filters shown and described can be employed in systems other than those specifically described. It is therefore, to be understood that within the scope of the appended claims the invention can be practised otherwise than as specifically described.

What is claimed is:

1. Frequency responsive circuit apparatus comprising:
    source means for providing an alternating analog signal;
    converter circuit means for converting said alternating analog signal into a pulse signal with pulse widths dependent upon the time period during which said analog signal remains beyond a reference level;
    filter and control circuit means receiving said pulse signal, said filter and control circuit means comprising timing means for producing an output signal and comprising energy storage means for receiving and storing energy in said pulse signal and further comprising primary detector means for providing a primary output signal in response to predetermined minimum pulse widths of said pulse signal as determined by the energy level in said energy storage means; and output circuit means responsive to said output signal.

2. An apparatus according to claim 1 wherein said energy storage means comprises R-C network means for measuring the pulse widths of said pulse signal.

3. An apparatus according to claim 2 wherein said converter circuit means comprises:
    threshold means receiving said analog signal and providing one output in response to amplitudes of said analog signal above a given level and a different output in response to amplitudes of said analog signal below said given level.

4. An apparatus according to claim 3 wherein said network means comprises regulator means for controlling the rate at which energy is received by said energy storage means when said threshold means is producing said one input.

5. An apparatus according to claim 4 wherein said network means comprises discharge means for removing energy from said energy storage means when said threshold means is producing said other output and at a rate much greater than the rate at which energy is received thereby.

6. An apparatus according to claim 1 wherein said timing means further comprises high pass means responsive to said primary output signal to produce said output signal only in response to pulse widths of said pulse signal that are less than said predetermined minimum pulse width.

7. An apparatus according to claim 6 wherein said converter circuit means comprises:
    threshold means receiving said analog signal and providing one output in response to amplitudes of said analog signal above a given level and a different output in response to amplitudes of said analog signal below said given level.

8. An apparatus according to claim 7 wherein said pulse continuity means comprises charging means to supply energy to said energy storage means when said threshold means is producing said one output and regulator means to discharge said energy storage means when said threshold is producing said other output, and said primary detector means produces said primary output in response to the absence of a predetermined energy level in said energy storage means.

9. An apparatus according to claim 1 wherein said timing means further comprises an auxiliary detector means that produces an auxiliary output only in response to a greater minimum pulse width of said pulse signal than said predetermined minimum pulse width.

10. An apparatus according to claim 9 wherein said timing means further comprises band pass means responsive to said primary and auxiliary outputs to produce said output signal in response to a pulse with of said pulse signal that is longer than said predetermined minimum pulse width and less than said greater minimum pulse width.

11. An apparatus according to claim 10 wherein said timing means further comprises a multiple input means that is triggered to produce said output signal by trailing transitions of said digital signal and inhibit means that enables said multiple input means in response to said primary output and disenables said multiple input means in response to said auxiliary output.

12. An apparatus according to claim 11 wherein said multiple input means comprises a one-shot.

13. An apparatus according to claim 9 wherein said timing means further comprises notch means responsive to said primary and auxiliary outputs to produce said output signal only in response to pulse widths of said pulse signal that are either less than said predetermined minimum pulse width or longer than said greater minimum pulse width.

14. An apparatus according to claim 13 wherein said timing means further comprises a multiple input means that is triggered to produce said output signal by trailing transitions of said pulse signal and inhibit means that disenables said multiple input means in response to said primary output and reenables said multiple input means in response to said auxiliary output.

15. An apparatus according to claim 14 wherein said multiple input means comprises a one-shot.

16. An apparatus according to claim 1 wherein said source means comprises transmitter and receiver means for directing wave energy into and receiving wave energy from a given zone, and Doppler circuit means coupled to said transmitter and receiver means and adapted to produce said analog signal in response to relative movement of objects in said given zone.

17. An apparatus according to claim 16 wherein said timing means further comprises high pass means responsive to said primary output to produce said output signal only in response to pulse widths of said digital signal that are less than said predetermined minimum pulse width.

18. An apparatus according to claim 16 wherein said output signal corresponds to said primary output.

19. An apparatus according to claim 16 wherein said timing means further comprises an auxiliary detector means that produces an auxiliary output only in response to a greater minimum pulse width of said pulse signal than said predetermined minimum pulse width.

20. An apparatus according to claim 19 wherein said timing means further comprises band pass means responsive to said primary and auxiliary outputs to produce said output signal in response to a pulse width of said pulse signal that is longer than said predetermined minimum pulse width and less than said greater minimum pulse width.

21. An apparatus according to claim 20 wherein said timing means further comprises a multiple input means that is triggered to produce said output signal by falling transitions of said pulse signal and inhibit means that enables said multiple input means in response to said primary output and disenables said multiple input means in response to said auxiliary output.

22. An apparatus according to claim 19 wherein said timing means further comprises notch means responsive to said primary and auxiliary outputs to produce said output signal only in response to pulse widths of said pulse signal that are either less than said predetermined minimum pulse width or longer than said greater minimum pulse width.

23. An apparatus according to claim 22 wherein said predetermined minimum pulse width and said greater minimum pulse width represent a frequency band centered at 120 Hertz.

* * * * *